United States Patent [19]

Shigematsu et al.

[11] Patent Number: 5,214,524
[45] Date of Patent: May 25, 1993

[54] OPTICAL COMMUNICATION SYSTEM

[75] Inventors: Masayuki Shigematsu; Akira Nishimura; Shuzo Suzuki, all of Yokohama, Japan

[73] Assignee: Sumitomo Electric Industries, Ltd., Osaka, Japan

[21] Appl. No.: 896,793

[22] Filed: Jun. 9, 1992

Related U.S. Application Data

[63] Continuation of Ser. No. 707,311, May 29, 1991, which is a continuation of Ser. No. 422,092, Oct. 16, 1989.

[30] Foreign Application Priority Data

Nov. 25, 1988 [JP] Japan .................. 63-297487

[51] Int. Cl.$^5$ .................. H04J 14/02; H04B 10/00
[52] U.S. Cl. .................. 359/124; 359/154
[58] Field of Search .............. 359/124, 127, 110, 154, 359/164

[56] References Cited

U.S. PATENT DOCUMENTS

| | | | |
|---|---|---|---|
| 4,635,246 | 1/1987 | Taylor et al. | 370/3 |
| 4,702,550 | 10/1987 | Sano | 370/3 |
| 4,831,663 | 5/1989 | Smith | 455/606 |
| 4,860,279 | 8/1989 | Falk et al. | 455/617 |

FOREIGN PATENT DOCUMENTS

| | | | |
|---|---|---|---|
| 0037857 | 10/1981 | European Pat. Off. | 455/610 |
| 3632047 | 4/1988 | Fed. Rep. of Germany . | |
| 60-204492 | 10/1985 | Japan . | |

OTHER PUBLICATIONS

Patterson et al., IEEE Transactions on Communications, vol. COM-27, No. 3, Mar. 1979, pp. 582-588.
Jack Koscinski, "Feasibility of Multi-Channel VSB/AM Transmission On Fiber Optic Links", 1987 NCTA Technical Papers, 1986, pp. 17-25.
J. P. Frankart, et al., "Analog Transmission of TV—Channels On Optical Fibers, With Non-Linearities Correction By Regulated Feedforward", Rev. H. F. Electron Telecommunication vol. 12 No. 9, 1984.

Primary Examiner—Edward L. Coles, Sr.
Assistant Examiner—Kinfe-Michael Negash
Attorney, Agent, or Firm—Cushman, Darby & Cushman

[57] ABSTRACT

An optical communication system of the optical feed forward type in which a main optical signal and a distortion signal are transmitted by a common optical fiber line from the transmission part to the reception part.

1 Claim, 3 Drawing Sheets

OPTICAL COMMUNICATION SYSTEM

This is a continuation of application Ser. No. 07/707,311, filed on May 29, 1991, which is a continuation of Ser. No. 07/422,092 filed Oct. 16, 1989.

BACKGROUND OF THE INVENTION

1. Field of the Invention

The present invention relates to an optical communication system, and more particularly to a system by directly amplitude-modulated optical transmission system in which the modulation distortion of the signal is suppressed by a feed forward control.

2. Description of the Prior Art

With development of optical cable communication networks, there have been proposed optical cable television systems (referred to as optical CATV hereinafter) in which television information and audio information are transmitted by means of optical fiber cables in place of coaxial electric cables. The use of the optical fiber cable networks can remarkably increase the amount of the information to be transmitted, enabling either increment of the number of transmission channels and extension of the transmission distance.

As the optical CATV transmission systems, there have been known a wide band frequency modulation system (referred to as FM system) and a residual side band amplitude modulation system (referred to as VSB/AM system). The VSB/AM system is disclosed in the literature entitled "FEASIBILITY OF MULTI-CHANNEL VSB/AM TRANSMISSION ON FIBER OPTIC LINK" NCTA TECHNICAL PAPER pages 17 to 25 1987. There is such a technical advantage in the FM system that S/N (signal to noise) ratio is large and the modulation distortion is small. On the other hand, technical disadvantage in the FM system is such that in order to transmit the signals in the optical fiber, it is necessary to provide a AM/FM converter for converting the electrical amplitude modulation signal into the FM signal, further it is necessary to provide a FM/AM converter for converting the FM signal received from the optical fiber into electrical AM signal. Therefore, the communication system is expensive. To the contrary, the VSB/AM system does not require such AM/FM converter and FM/AM converter and the communication system is inexpensive and simple in structure.

In the VSB/AM system, the optical signals are generated by modulating the amplitude of the current applied to a semiconductor laser. However, since the relation between the input current and the light output power of the light emitting unit such as a semiconductor laser is generally non linear, high order harmonic distortion is contained in the wave shape of the light output, resulting in lowering CN ratio which is similar to S/N ratio. Specifically, the output power of the semrconductor laser can not increase proportional to the increment of the input current to the semiconductor laser, but the output of the semiconductor contains modulation distortion proportional to the square and cube of the applied current to the semiconductor laser. Therefore, in case where the information is transmitted with the carrier whose frequency is f1 there are generated higher frequency spurious components of 2f1 and 3f1 or the like in addition to the frequency component of f1. If there is another carrier wave near the spurious frequencies 2f1 and 3f1, the modulation distortion components act to another carrier wave as the noise components, resulting in deteriorating the CN ratio. One way of preventing deterioration of the CN ratio is to drive the semiconductor laser with a constant bias current and the light generated by the semiconductor laser is modulated using amplitude modulating unit having a linear modulation property (external modulation). Another way is so called feed forward method (referred to as optical FF method hereinafter) disclosed in the literature "ANALOG TRANSMISSION OF TV-CHANNELS ON OPTICAL FIBER , WITH NON-LINEARITIES CORRECTION BY REGULATED FEED FORWARD" FRANKART. J.P. et al. REV. H.F. ELECTRON TELECOMMUNICATION VOL. 12 NO. 9 1984. In the FF method, the signals to be transmitted are applied to a semiconductor laser, and the main light signals obtained by the semiconductor laser are compared with a part of the original electric signals so as to obtain correction signals. Then a feed forward control is performed by adding the correction signals to the main received light signals after detection so that the modulation distortion generated in the semiconductor laser is suppressed.

In using the external modulation, it is one problem that it is difficult to obtain an external modulator having linear modulation property. When the optical feed forward system is produced as it is designed, it is possible to suppress the modulation distortion minimum, there must be provided two optical fiber lines always.

FIG. 1 shows a general structure of an optical communication system employing the optical feed forward system. In the optical feed forward system shown in FIG. 1 the electric analog signal Se to be transmitted is divided into two analog signals Se1 and Se2 by a branch unit 1 and one of the signals Se1 drives a main semiconductor laser 2, which generates amplitude-modulated optical signals. A part of the optical signal is derived from the optical signal by an optical branch unit 3, being converted into an electrical signal Se3 by an auxiliary light receiving element 9. Another signal Se2 divided by the electric branch unit 1 and the electric signal Se3 converted by the auxiliary light receiving element 9 have their phases and amplitudes adjusted by a delay line 6 and an amplifier 10, thereafter both signals Se2 and Se3 are subtracted by a combiner 8, whereby an electric signal Sd corresponding to the high order harmonic distortion component of the semiconductor laser 2 is formed in the combiner 8. The electric signal Sd is amplified by an amplifier 11 and thereafter drives a correction light emitting unit 12, thus correction light signal So2 is formed. The correction light signal So2 (referred to as distortion signal) is transmitted by an optical fiber line 13. The remainder optical signal So1 (referred to as main signal) taken out from the optical branch unit 3 is transmitted by an optical fiber line 4. The distortion signal So2 and the main signal So1 transmitted by the respective optical fiber lines are converted into electric signals Se4 and Se5 by the light receiving elements 5 and 14. The respective electric signals Se4 and Se5 have their phase and amplitude adjusted by a delay line 16 and an amplifier 15 and thereafter summed in a combiner 17 so as to eliminate the modulation distortion, whereby an analog signal Se without the modulation distortion can be reproduced. However, according to the optical feed forward system mentioned above, since the main signal and distortion signal are transmitted by the separate optical fiber lines, the optical fiber lines become expensive and the wide band property of the optical fiber can not be effectively used.

SUMMARY OF THE INVENTION

An essential object of the present invention is to provide an optical communication system in which the optical feed forward system can be realized by one optical fiber line.

In order to accomplish the object of the present invention mentioned above, there is provided an optical communication system of the optical feed forward type in which the main signal and the distortion signal are transmitted by a common optical fiber line from the transmission part to the reception part.

By the arrangement of using a single optical fiber line for transmission of the main optical signal and the distortion signal, it is possible to form the optical communication system of feed forward type cheap with high stabilized communication. Accordingly the communication system according to the present invention is suitable for a long distance multi channel optical fiber communication such as so called a CATV and a picture transmission.

DETAILED DESCRIPTION OF THE PREFERRED EMBODIMENT

Figure 1:
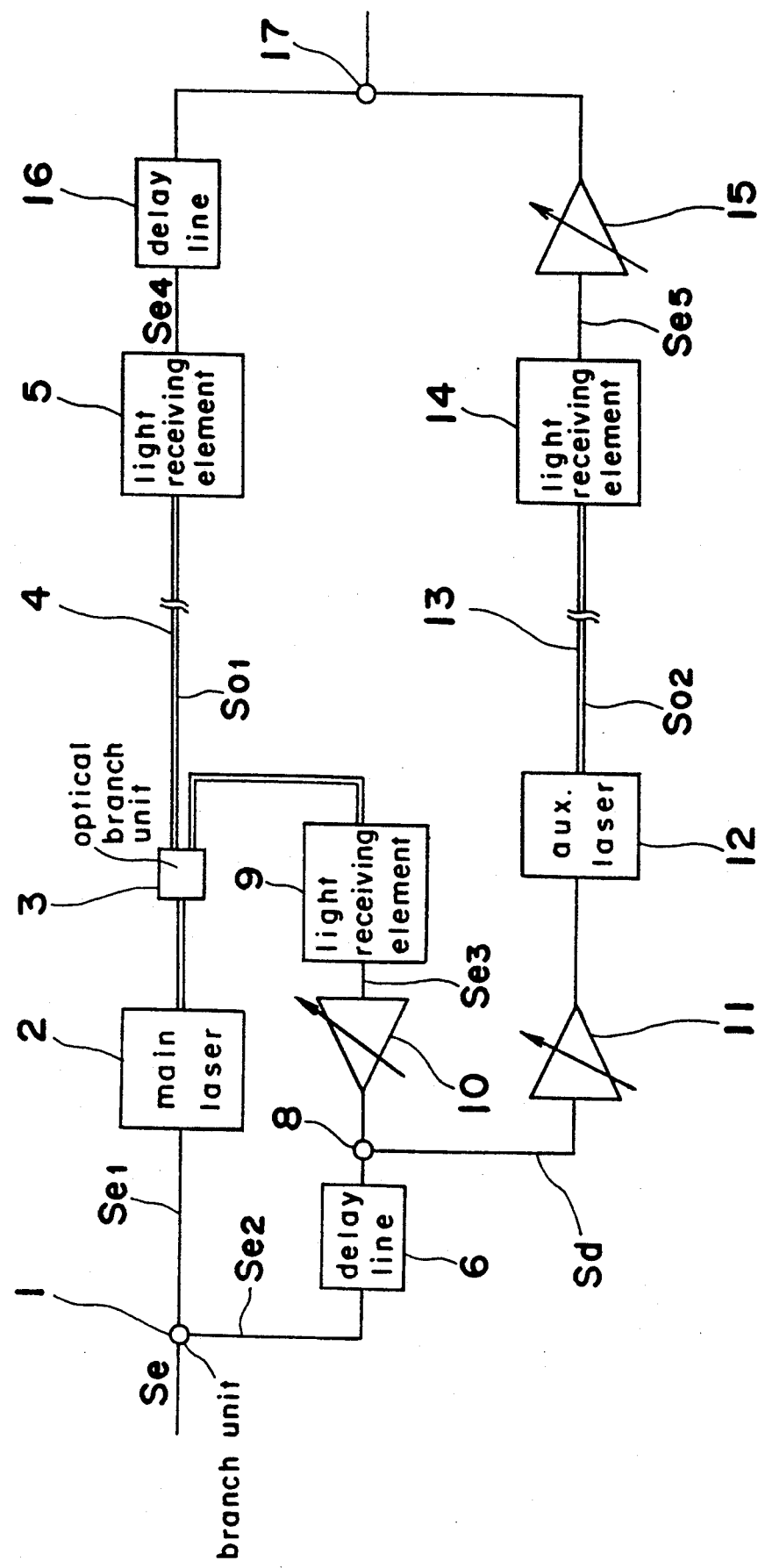
FIG. 1 is a block diagram showing a general structure of a conventional optical feed forward system.

Before the description proceeds, it is noted that like parts are designated by like reference numerals.

The optical communication system shown in FIG. 2 basically comprises a main semiconductor laser 20 for generating optical signals by amplitude-modulating the carrier light of the laser 20 in response to the amplitude of analog signals to be transmitted (referred to as transmission signal hereinafter), an optical fiber line 22 for transmitting the amplitude-modulated optical signal and a light receiving element 21 for reproducing the optical signal transmitted by the optical fiber line 22 in the electric signal. As the main semiconductor laser 20, there is used a semiconductor laser of Fabry-Perot type with an isolater, oscillating at the wavelength of $\lambda 1$ such as 1.3 $\mu$m and as the light receiving element 21, a PIN photo diode made of In Ga As is used. Between the optical fiber line 22 and the main semiconductor laser 20 there are disposed an optical divider 24 which branches a part of the optical signal generated from the main semiconductor laser 20 at the port 24b connected to a branch line 26 and an optical multiplexer 40 for applying the distortion signal So2 to the optical fiber line 22.

Between the optical fiber line 22 and the light receiving element 21, there is provided an optical demultiplexer 41 for branching the distortion signal So2 in $\lambda 2$ band from the main signal in $\lambda 1$ band both transmitted by the optical fiber line 22.

Further, a transmission signal branch unit 35 for branching a part of the transmission electrical signal is provided on a connection line which connects the transmission signal input port and the main semiconductor laser 20. The transmission signal branch unit 35 is also connected to the transmission signal branch line 25. A delay line 27 is provided on the transmission signal branch line 25 and is ended by a subtracting point or a combiner circuit 36. On the optical signal branch line 26, there are provided a light receiving element 30 for demodulating the optical signal branched by the optical divider 24 into an electric signal Se3 representing the transmission signal and the distortion signal, which represents the high order harmonic signals, and an amplifier 28 of a variable gain type for amplifying the signal from the light receiving element 30. As the light receiving element 30, a PIN photo diode made of In Ga As is used. The output terminal of the amplifier 29 is connected to the -combiner 36. The combiner 36 performs a subtraction between the output signal of the delay line 27 and the output signal of the amplifier 28s, after the phase of both output signals are adjusted to coincide each other by the delay line 27 and the amplitude of both output signals are adjusted to coincide each other by the amplifier 28, producing an electric signal Sd representing the high order harmonic distortion component generated in the amplitude-modulation performed in the main semiconductor laser 20. An amplifier 29 of a variable gain type is connected to the output terminal of the combiner 36 and the output of the amplifier 29 is connected to a semiconductor laser 31 (referred to as correction semiconductor laser). As the correction semiconductor laser 31, there is used a DFB semiconductor laser which generates light of wavelength $\lambda 2$ for example 1.54 $\mu$m. The correction semiconductor laser 31 generates a distortion signal or correction light signal, which is an amplitude-modulated optical signal corresponding to the output of the amplifier 29. The distortion signal So2 is applied to the optical fiber line 22 through the optical multiplexer 40.

The optical demultiplexer 41 connected to the optical fiber line 22 branches the distortion signal of wavelength $\lambda 2$ and the branched distortion signal is transmitted to a correcting light receiving element 32. As the correcting light receiving element 32, there is used a PIN photo diode made of In Ga As which converts the distortion signal of $\lambda 2$ into an electric signal. The converted electric signal corresponds to the high order harmonic distortion component mentioned above. An amplifier 34 is connected to the output terminal of the correcting light receiving element 32. The light receiving element 21 is connected to the output terminal of the optical demultiplexer 41 which outputs the main signal of the wavelength of $\lambda 1$ and the light receiving element 21 outputs an electric signal corresponding to the main signal So1. A delay line 33 is connected to the output terminal of the light receiving element 21. The delay line 33 and the amplifier 34 are connected to a combiner 42. In the combiner 42 the electrical signal corresponding to the main signal So1 and the electric signal corresponding to the high order harmonic distortion component are synthesized, after they are adjusted in terms of the phase and amplitude, so that the modulation distortion which occurs at the time of amplitude modulation in the main semiconductor laser 20 can be eliminated.

Figure 3:
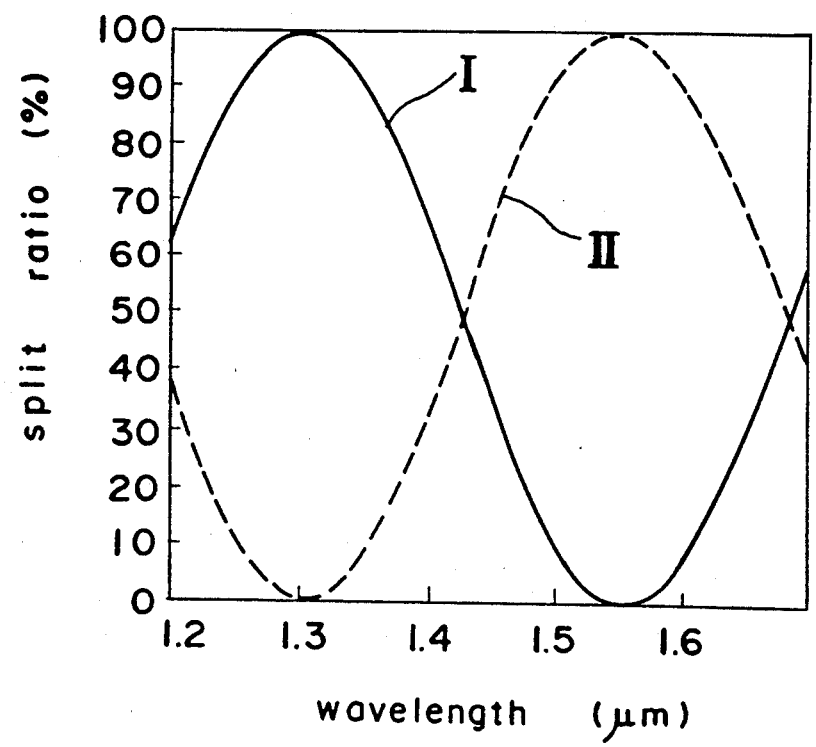
FIGS. 3 and 4 show optical multiplexing property and optical branching property of the optical fiber coupler used in the embodiment shown in FIG. 2.

As the optical multiplexer 40 and optical demultiplexer 41, it is desired to use such an optical fiber coupler having optical multiplex and demultiplexing properties as shown in FIG. 3. In FIG. 3, the property I shown in the real line can be obtained between the ports 40a and 40c of the multiplexer 40 and 41a and 41c of the demultiplexer 41, for transmission of the optical signals of 1,3 $\mu$m band, while the property II shown in the dotted lines can be obtained between the ports 40b and 40c of the multiplexer 40 and 41b and 41c of the demultiplexer 41 for transmission of the optical signals of 1,55 μm band. As the optical fiber coupler mentioned above, there may be used such optical fiber coupler as disclosed in a literature entitled "RECENT OPTICAL FIBER COUPLER TECHNICS" in "OPTRONICS" vol. 5 pages 125 to 126. The optical fiber coupler disclosed in the literature can be formed with the insertion loss less than 1 dB for the light of wavelengths 1.3 μm and 1.55 μm. Therefore, CN ratio at the output of the combiner 42 is not deteriorated.

Figure 2:
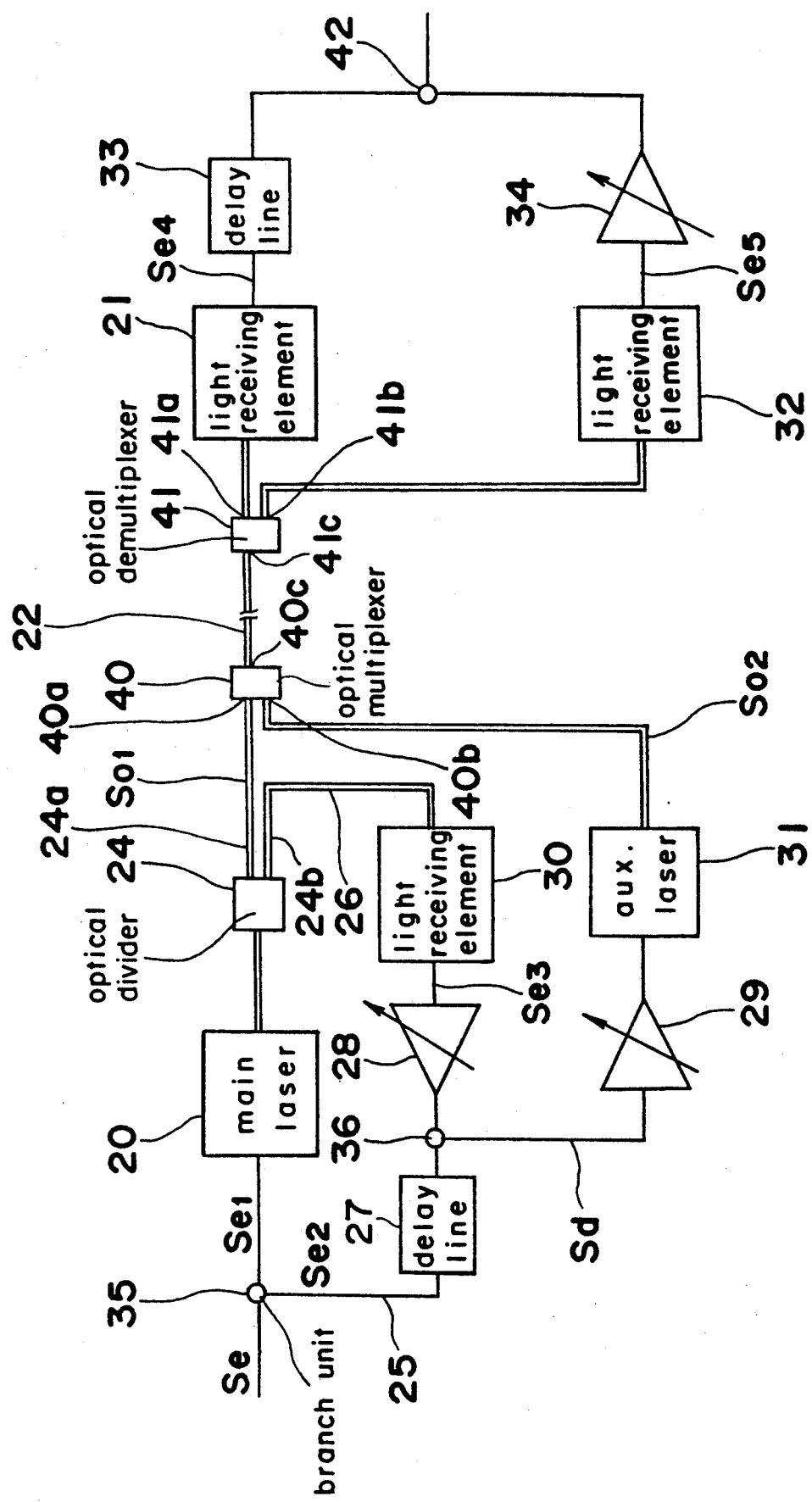
FIG. 2 is a block diagram showing a general structure of an optical communication system according to the present invention.

Operation of the embodiment of the optical feed forward system shown in FIG. 2 is explained hereinafter.

The transmission signal Se is branched in two analog signals Se1 and Se2 by the signal branch unit 35. The analog signal Se1 drives the main semiconductor laser 20 and is converted into the amplitude-modulated optical signal of 1.3 μm band. A part of the optical signal is taken out by the optical divider 24 and is converted into the electric signal Se3 by the light receiving element 30. The analog signal Se2 branched by the branch unit 35 is applied to the delay line 27 and the phase of the signal Se2 is adjusted to coincide with the phase of the output signal of the amplifier 28, being applied to the combiner 36. On the other hand, the signal Se3 is applied to the amplifier 28 and the amplitude of the signal Se3 is adjusted to coincide with the amplitude of the output signal of the delay circuit 27, being applied to the combiner 36. Both output signals of Se2 and Se3 are subtracted, whereby the electric signal Sd corresponding to the high order harmonic distortion component generated in the main semiconductor laser 20 can be formed. The electric signal Sd is amplified by the amplifier 29, then drives the semiconductor laser 31 so that the semiconductor laser 31 generates the distortion signal So2 which is the amplitude-modulated optical signal in 1.55 μm band modulated by the high order harmonic distortion mentioned above. The distortion signal So2 is applied in the optical fiber line 22 through the optical multiplexer 40 and transmitted thereby. On the other hand, the main signal So1 taken out by the optical divider 24 is transmitted by the same optical fiber line 22.

The distortion optical signal So2 transmitted by the optical fiber line 22 is separated by the optical demultiplexer 41 and transmitted to the correcting light receiving element 32, whereby the distortion signal So2 is converted or demodulated into the electric signal Se5 representing the high order harmonic distortion by the light receiving element 32. The main signal So1 transmitted by the optical fiber line 22 is converted or demodulated into the electric signal Se4 by the light receiving element 21. The electric signals Se4 and Se5 are, after their phase and amplitude are adjusted by the delay line 33 and the amplifier 34, summed by the combiner 42 to eliminate the modulation distortion, whereby the analog signal Se without the modulation distortion can be reproduced.

In the embodiment mentioned above, the optical fiber line 22 was a conventional single mode optical fiber for 1.3 μm with 10 km long. The main semiconductor laser 20 was modulated by sine wave of 70 MHz whereby it was possible to decrease by 10 dB of the modulation distortion of secondary harmonic component of 140 MHz compared in case where the feed forward system was not used. In case where the optical fiber line 22 is accommodated in the constant temperature bath, changing the temperature in the range from −40° C. to +85° C., the variation of the secondary order harmonic component was small lower than 1 dB at the combiner 42. This is because, since the main signal and the distortion signal are transmitted by the same optical fiber line 22, the effect of the change of temperature acts to both of the main signal and the distortion signal substantially equally, whereby the difference between the main signal and the distortion signal in terms of the phase and amplitude is almost equal.

In view of the effect mentioned above, the present invention in which the main signal and the distortion signal are transmitted in the same optical fiber line is superior to the prior art optical feed forward system which the main signal and the distortion signal are transmitted by separate optical fiber cable lines.

The present invention is not limited to the embodiment described above but can be modified in various ways. For example, In order to adjust the phase and amplitude of the signals applied to the combiners 36 or 42, there may be used a combination of the phase adjusting circuit and the amplitude adjusting circuit in the respective input circuits of the combiners 36 and 42.

Figure 4:
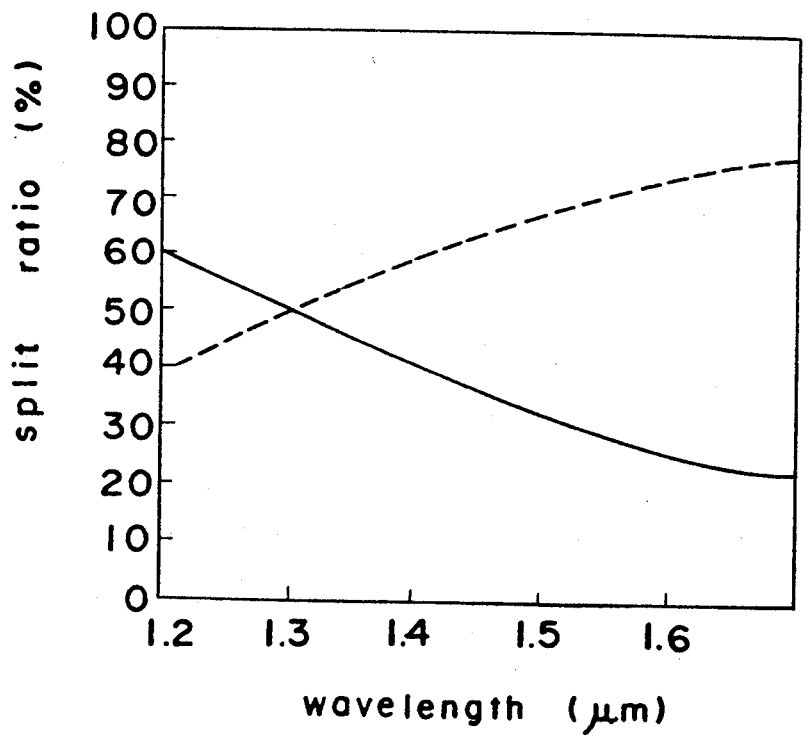

In addition, as the optical multiplexer and/or demultiplexer there may be used an optical coupler of 1.3 μm wavelength range with 50% split ratio as shown in FIG. 4, if the attenuation of the signal of about 6 dB can be allowed.

For example, although in the embodiment mentioned above, the wavelength λ1 of the light of the main semiconductor laser for the main signal is different from the wavelength λ2 of the semiconductor laser for correction for generating the distortion signal, there may be used semiconductor lasers which generate light of the same wavelength band. However, in this case it is necessary to use optical multiplexer and demultiplexer which separate optical signals of similar wavelengths.

What is claimed is:
1. An optical communication system comprising:
main light emitting means for emitting an amplitude-modulated main optical signal at a band being one of about 1.3 μm and 1.55 μm in response to an analog electric signal to be transmitted;
correction electric signal forming means for converting a part of the main optical signal from the main light emitting means into an electric signal, and then forming a correction electric signal corresponding to the modulation distortion generated at the time of the amplitude modulation in the main light emitting means;
an auxiliary light emitting means having a wavelength at a band being one of about 1.3 μm and 1.55 μm that differs from a wavelength of the main light emitting means by about 0.2 μm, for generating an amplitude-modulated correction optical signal in response to the correction electric signal;
an optical fiber line for transmitting the main optical signal from the main light emitting means;
main light receiving means for converting the main optical signal transmitted through the optical fiber line into a first analog electric signal;
combining means for multiplexing the correction optical signal in said main optical fiber line;
separating means for demultiplexing the correction optical signal from the main optical signal transmitted through said optical fiber line;
auxiliary light receiving means for converting the correction optical signal demultiplexed by the sep- arating means into a second analog electric signal; and reproducing means for summing the second analog electric signal generated by said auxiliary light receiving means with the analog electric signal generated from the main light receiving means to generate a summed analog electric signal to be transmitted without modulation distortion;

wherein said optical communication system has a CN ratio that is not deteriorated by modulation and said optical communication system causes no loss of light signals via branching and combining the signals.

* * * * *